United States Patent [19]

Michel

[11] 4,414,356

[45] Nov. 8, 1983

[54] TETRAFLUOROETHYLENE COPOLYMER

[75] Inventor: Rudolph H. Michel, Wilmington, Del.

[73] Assignee: E. I. Du Pont de Nemours and Company, Wilmington, Del.

[21] Appl. No.: 465,467

[22] Filed: Feb. 10, 1983

Related U.S. Application Data

[63] Continuation-in-part of Ser. No. 310,068, Oct. 9, 1981, abandoned.

[51] Int. Cl.$^3$ ................................................ C08K 3/04
[52] U.S. Cl. ..................................... 524/496; 524/535
[58] Field of Search ............................... 524/496, 535

[56] References Cited

U.S. PATENT DOCUMENTS 4,163,742  8/1979  Mansure .............................. 523/222

OTHER PUBLICATIONS

Hercules "Magnamite Graphite Fibers," Product Data No. 847, Jan. 1, 1979, (single sheet).
Hercules "Magnamite Graphite Fiber," No. 8311, no date (single sheet).
Hercules Graphite Fiber Products, Revision 4, no date.

*Primary Examiner*—Melvyn I. Marquis

[57] ABSTRACT

An intimate blend of a melt-fabricable tetrafluoroethylene copolymer resin and graphite reinforcing fibers having an untreated surface is obtained by intimately blending the resin and fibers in a mixture of water and a selected water-miscible organic solvent. Composites molded from the blend have good resistance to steam and alkali.

1 Claim, No Drawings

TETRAFLUOROETHYLENE COPOLYMER

CROSS REFERENCE TO OTHER APPLICATIONS

This application is a continuation-in-part of application Ser. No. 310,068 filed Oct. 9, 1981 and now abandoned.

FIELD OF THE INVENTION

This invention relates to melt-fabricable reinforced tetrafluoroethylene copolymers.

BACKGROUND OF THE INVENTION

Fibrous fillers, such as asbestos, glass, or graphite fibers, have been used to improve mechanical properties of melt-fabricable tetrafluoroethylene copolymer resins. While some properties are improved by the presence of these fillers, improvement in other properties is desirable. Heretofore, the graphite fibers used as fillers have been fibers in which the surface has been chemically treated to increase its oxygen and nitrogen content and thereby the surface polarity.

SUMMARY OF THE INVENTION

It has now been found that reinforced resins having improved resistance to alkali environments at elevated temperatures and improved resistance to the effect of steam can be obtained by an intimate admixture of a major portion of a melt-fabricable tetrafluoroethylene copolymer resin and a minor portion of graphite fibers having an untreated surface, so that the oxygen content averages less than 6 atom % and the nitrogen content averages less than 3 atom % in the outermost 5 nm of fiber cross section.

The blend is obtained by mixing the resin and the fibers in a mixture of water and a water-miscible organic solvent.

DESCRIPTION OF THE INVENTION

The tetrafluoroethylene copolymer resins employed herein are melt-fabricable ones, as opposed to nonmelt-fabricable resins typified by the homopolymer, polytetrafluoroethylene. Generally, polymers of the nonmelt-fabricable variety have melt viscosities of $1 \times 10^9$ poises or more at 380° C. whereas melt-fabricable tetrafluoroethylene copolymers have sufficient comonomer present to lower the crystallinity to permit melt fabrication into articles with useful properties. These copolymers have melt viscosities of $1 \times 10^4 - 1 \times 10^7$ poises at 380° C.

The melt viscosity of useful copolymers depends on the amount of comonomer present. Generally, the more comonomer present, the lower the melt viscosity. Thus, the melt-fabricable tetrafluoroethylene copolymers employed herein comprise copolymers of tetrafluoroethylene and a different perfluorinated ethylenically unsaturated organic copolymerizable monomer present in an amount which allows the melt viscosity of the resultant copolymer to be below $1 \times 10^7$ poise at 380° C. One preferred class of ethylenically unsaturated monomers is the perfluoro (alkyl vinyl ethers) of 3-7 carbon atoms. Generally, the copolymer can contain 0.5-20% by weight of these comonomers. Another preferred class is the perfluoro (terminally unsaturated olefins) of 3-7 carbon atoms. Generally, the copolymer can contain up to about 10-25% by weight of these comonomers. If less than the amount specified is present, the copolymer described above will not be melt-fabricable; on the other hand, if more than the amount specified is present, the copolymer will become elastomeric. The resin particles should have an average size below 400 $\mu$m and preferably below 20 $\mu$m. Ordinarily the size will be between 5 $\mu$m and 20 $\mu$m.

Any graphite fibers can be employed to reinforce the tetrafluoroethylene copolymer resin provided they have not been treated by a process which increases surface oxygen and nitrogen content and thereby surface polarity. Preferably the fibers have tensile strengths of at least 200,000 psi and an average length of at least 2 mm and preferably between 2-30 mm. Fibers less than 2 mm long tend to result in moldings of less strength than when the fibers are longer. The fibers preferably have an aspect ratio of at least 100 and most preferably between 200 and 1500. The fibers average less than 6 atom % oxygen and less than 3 atom % nitrogen in the outermost 5 nm of the fiber cross section. The atom % present was measured by ESCA (electron spectroscopy chemical analysis).

To prepare the blend of copolymer and fiber, the two are mixed, together or separately, in any order in an aqueous medium containing a water-miscible organic solvent. By "water-miscible" is meant that the solvent is soluble in water to the extent of at least 25% by weight. Preferably, the solvent is soluble in water in all proportions.

The amount of copolymer resin in the blend is between 50-99% by weight of mixture, and preferably 70-99% (the remainder being graphite fiber). The amount of graphite fiber in the aqueous mixture can be between about 5 and 30 gm per 1,000 gm of mixture. The amount of organic solvent in the aqueous medium can be 1-90% by weight of medium but preferably is between 5-25%.

The organic solvent can be any water-miscible aliphatic (preferably alkyl) ketone, alcohol, or glycol, containing up to 8 carbon atoms. Examples of such solvents include acetone, methyl ethyl ketone, methanol, ethanol, isopropyl alcohol, t-butyl alcohol, and propylene glycol. Isopropyl alcohol or acetone are preferred.

Temperature and pressure are not critical in the preparation of the blend and usually atmospheric conditions are employed during blending.

Preferably, the polymer is wet with a small amount of the organic solvent, then sufficient water is added to provide an aqueous solution of solvent within the range specified above, followed by addition of graphite fiber, and then by stirring. Stirring is carried out vigorously to thoroughly mix the ingredients. Usually, a Waring blender is employed. The resulting blend is separated from the aqueous mixture (usually by filtering) and is dried, e.g., in vacuum at an elevated temperature (e.g., 120°-150° C.).

In the Examples provided below, physical parameters employed therein were determined as follows:

Melt viscosity of the tetrafluoroethylene copolymers is measured according to ASTM D-1238-52T modified by (1) using a cylinder, orifice and piston tip made of a corrosion-resistance alloy, Haynes Stellite 19, (2) charging a 5.0 g sample to the 9.53 mm inside diameter cylinder which is maintained at 372° C.±1° C., (3) extruding the sample 5 minutes after charging through a 2.10 mm diameter, 8.00 mm long square-edged orifice under a load (piston plus weight) of 5000 g (this corresponds to a shear stress of 0.457 kg/cm$^2$). The melt viscosity in poise is calculated as 53150 divided by the observable extrusion rate in grams per minute and recalculated for conversion to 380° C. by multiplying by 0.92.

Average particle size of resin and fibers is measured by optical microscopy.

Compressive deformation is measured by ASTM test D-621-64 by measuring deformation under 14 MPa pressure at room temperature.

Compressive strength was determined by ASTM test D-695.

EXAMPLE 1

Finely divided resin powder of a melt-fabricable copolymer of tetrafluoroethylene and 3.0 wt % perfluoro (propyl vinyl ether) of melt viscosity about $4.0 \times 10^4$ poise at 380° C. and an average particle size of about 5 μm was blended in a Waring blender with 43% acetone/57% water (by volume). The acetone was added first to thoroughly wet the resin and then the water was added. To this suspension of resin in solvent were added Hercules "Magnamite", Type AU, untreated, graphite fibers which had been hand cut to an average length of about 6 mm. The atom % oxygen (average) was below 6 atom %, and the atom % nitrogen (average) was below 3% in the outermost 5 nm of fiber. The mixture was vigorously stirred for two minutes. The mixture contained:

| Example | Wt. % Fibers | Fibers (grams) | Resin (grams) | Acetone (gram) | Water (gram) |
| --- | --- | --- | --- | --- | --- |
| 1 | 20 | 64 | 256 | 1200 | 2000 |

The blend was filtered in a 20 cm × 20 cm filter to give a 20 cm × 20 cm preform. Composite samples dried at 150° C. under vacuum for 48 hrs were compression molded into 20 cm × 20 cm × approximately 1.9 cm specimens first at room temperature under 6.5 MPa, then at 345° C. for 1 hr at 27 MPa and cooled to room temperature under 6.5 MPa pressure.

COMPARISON SAMPLE

The procedure of Example 1 was followed, except that Hercules "Magnamite", Type AS, 6 mm treated, chopped graphite fiber was employed in place of the untreated fiber of Example 1. The fiber had an average of 9 atom & oxygen and 4.5 atom & nitrogen in the outermost 5 nm of fiber cross section.

Effect of Alkali on Composites at 260° C.

The composites employed were 1.3 cm test cubes. They were exposed to 50% aqueous sodium hydroxide at 100° C. by submersion for 30 days. Results were as follows:

| | | Effect of Alkali Submersion on Compressive Deformation Resistance in Percent | | | | | | Effect of Alkali Submersion on Compressive Strength (MPa) before/after submersion | |
| --- | --- | --- | --- | --- | --- | --- | --- | --- | --- |
| | Wt Gain | Initial* Deformation before/after | | 24 Hr Deformation before/after | | Permanent Deformation before/after | | | |
| Composition | % | submersion | | submersion | | submersion | | Before | After |
| Comparison Treated Fiber | 1.2 | 1.3 | 2.6 | 0.1 | 0.5 | 0.1 | 0.7 | 157 | 113 |
| Example 1 Untreated Fiber | 0.1 | 1.4 | 1.5 | 0.1 | 0.1 | 0.1 | 0.1 | 221 | 202 |

*Initial deformation - during first 10 sec; 24 hr deformation - not including first 10 sec; permanent deformation - residual after pressure released

| | Effect of 260° C. Steam on Composites The composites* were subjected to steam at 260° C. in a pressure vessel for 7 days. | | |
| --- | --- | --- | --- |
| Composition | Warpage** Increase (mm) | Thickness Increase % | Weight Gain % |
| Comparison Treated Fiber | 0.065 | 1.3 | 0.2 |
| Example Untreated Fiber | 0.030 | 0.5 | 0.02 |

*2.5 cm diameter disk, 2.5 mm thick in molding direction.
**Warpage is measured as the change in the average spread in height (mm) of a cube placed on a flat surface.

The table shows that substantially no deterioration occurred in the compressive properties and that disk warpage was reduced in the Examples of this invention.

I claim:

1. A composition consisting of an intimate admixture of a major portion of (a) a melt-fabricable tetrafluoroethylene copolymer resin having a melt viscosity between $1 \times 10^4$ and $1 \times 10^7$ poises at 380° C. and an average particle size of below 400 μm, and wherein the comonomers used to make the copolymer are perfluorinated ethylenically unsaturated organic copolymerizable monomers, and a minor portion of (b) graphite fibers that have not been treated by a process which increases surface oxygen and nitrogen content and which have an average of less than 6 atom % oxygen and less than 3 atom % nitrogen in the outermost 5 nm of fiber cross section.

* * * * *